United States Patent [19]

Van Der Molen

[11] Patent Number: 5,657,560

[45] Date of Patent: Aug. 19, 1997

[54] SEALING A STEAM CHAMBER OF A STEAM IRON

[75] Inventor: Jacobus H. Van Der Molen, Drachten, Netherlands

[73] Assignee: U.S. Philips Corporation, New York, N.Y.

[21] Appl. No.: 548,935

[22] Filed: Oct. 26, 1995

[30] Foreign Application Priority Data

Oct. 28, 1994 [EP] European Pat. Off. ............ 94203155

[51] Int. Cl.$^6$ .................................................. D06F 75/18
[52] U.S. Cl. .................................................. 38/77.83
[58] Field of Search ............................ 38/77.82, 77.83, 38/88, 93, 77.9; 29/411, 445, 462, 509, 515, 525.1, 707, 709, 715

[56] References Cited

U.S. PATENT DOCUMENTS

| | | | |
|---|---|---|---|
| 4,240,217 | 12/1980 | Schwob | 38/77.83 |
| 4,378,174 | 3/1983 | Hesse | 29/511 X |
| 4,471,541 | 9/1984 | Schwob | 38/77.8 |
| 4,711,010 | 12/1987 | Walter | 29/157 R |
| 5,146,700 | 9/1992 | Prosser | 38/77.9 |
| 5,263,238 | 11/1993 | Cooper | 29/509 X |

FOREIGN PATENT DOCUMENTS

| | | |
|---|---|---|
| 2530926 | 1/1977 | Germany . |
| 2557628 | 7/1977 | Germany . |
| 2724257 | 12/1977 | Germany . |

*Primary Examiner*—Ismael Izaguirre
*Attorney, Agent, or Firm*—Ernestine C. Bartlett

[57] ABSTRACT

A method of sealing a steam chamber (4) of a steam iron (1), which steam chamber is bounded by a soleplate (3) and a metal cover plate (5), the soleplate being formed with a groove (8), a peripheral edge (10) of the cover plate (5) being placed into the groove (8), and subsequently a metal wire (11) being fitted into the groove, after which the metal wire is deformed by a pressing tool (13), the deformed wire pressing contact surfaces (10a, 10b) of the cover plate against contact surfaces (8a, 8b) of the groove and thereby provides the sealing.

14 Claims, 3 Drawing Sheets

SEALING A STEAM CHAMBER OF A STEAM IRON

BACKGROUND OF THE INVENTION

The invention relates to a method of sealing a steam chamber of a steam iron, which steam chamber is bounded by a soleplate and a metal cover plate, the soleplate being formed with a groove, after which contact surfaces of the cover plate and the soleplate at the location of the groove are connected to one another by means of a pressing tool.

Such a method is known from U.S. Pat. No. 4,711,010. In this steam iron a groove is formed in an upper edge of an upright wall of the soleplate, which bounds the steam chamber. By applying pressure to the cover plate, portions of the cover plate are forced into the groove, as a result of which a sealing is obtained between the cover plate and the upright wall of the steam chamber. For this purpose the cover plate is made of a material whose yield limit is lower than that of soleplate material. In order to ensure a satisfactory sealing with this method the groove should have a cross-sectional shape of a trapezoidal dovetail. Making such a groove is often very difficult. For this process the cover plate should be comparatively thick in order to achieve a correct deformation of the material. The disadvantage of a thick cover plate is that differences in shrinkage result in substantial forces at the contact surfaces.

SUMMARY OF THE INVENTION

It is an object of the invention to provide a simple and effective method of sealing a steam chamber of a steam iron, which provides a very good sealing.

To this end the method in accordance with the invention is characterised in that the contact surfaces of the cover plate are placed into the groove and subsequently a metal wire is fitted into the groove, after which the metal wire is deformed by means of the pressing tool, the deformed wire pressing the contact surfaces of the cover plate against the contact surfaces of the groove and thereby provides the sealing.

Grooves of special cross-sectional shape are not necessary. The groove can simply have a rectangular cross-sectional shape. Apart from the advantage that this method provides a simple and very effective sealing the method also has the advantage that thin cover plates can be used. A thin cover plate has a low heat capacity. As a result of this, condensation at the inner side of the cover plate is only minimal, which considerably reduces so-called sputter effect of the steam iron, which occurs when condensation drops falling onto the hot soleplate are not correctly transformed into steam. Preferably, the cover plate has a thickness between 0.2 and 0.6 mm. A thin cover plate also enables expansion ridges to be formed in this cover plate. This reduces the forces to which the seal is subjected during operation of the steam iron.

The invention also relates to a steam chamber for use in a steam iron, which steam chamber comprises at least one wall and a cover plate, the wall having a groove in which a peripheral edge portion of the cover plate and a sealing medium are situated to connect the cover plate and the wall to one another for the purpose of sealing. In accordance with the invention the sealing medium consists of a deformed metal wire, the peripheral edge portion of the cover plate being clamped between wall portions of the groove and the metal wire.

In one embodiment the steam chamber comprises a bottom with upright side walls, the groove being formed in an upper edge of the upright side walls. However, the groove may also be formed directly at the inner side of the soleplate. It is to be noted that U.S. Pat. No. 4,240,217 describes an electric steam iron in which a peripheral skirt of a cover plate for the steam chamber is also fitted in a groove at the inner side of the soleplate. However, here sealing is achieved by interposing of a sealant such as a silicone or rubber paste. The use of pastes in manufacturing processes is often time-consuming and troublesome.

The invention also relates to a soleplate provided with the steam chamber described above, in which the bottom, or the bottom and the upright side walls, is/are integral with the soleplate.

The invention further relates to a steam iron having a housing, a soleplate and a steam chamber as described above.

DETAILED DESCRIPTION OF THE PREFERRED EMBODIMENTS

The invention will be described in more detail with reference to the figures of the drawings.

Figure 1:
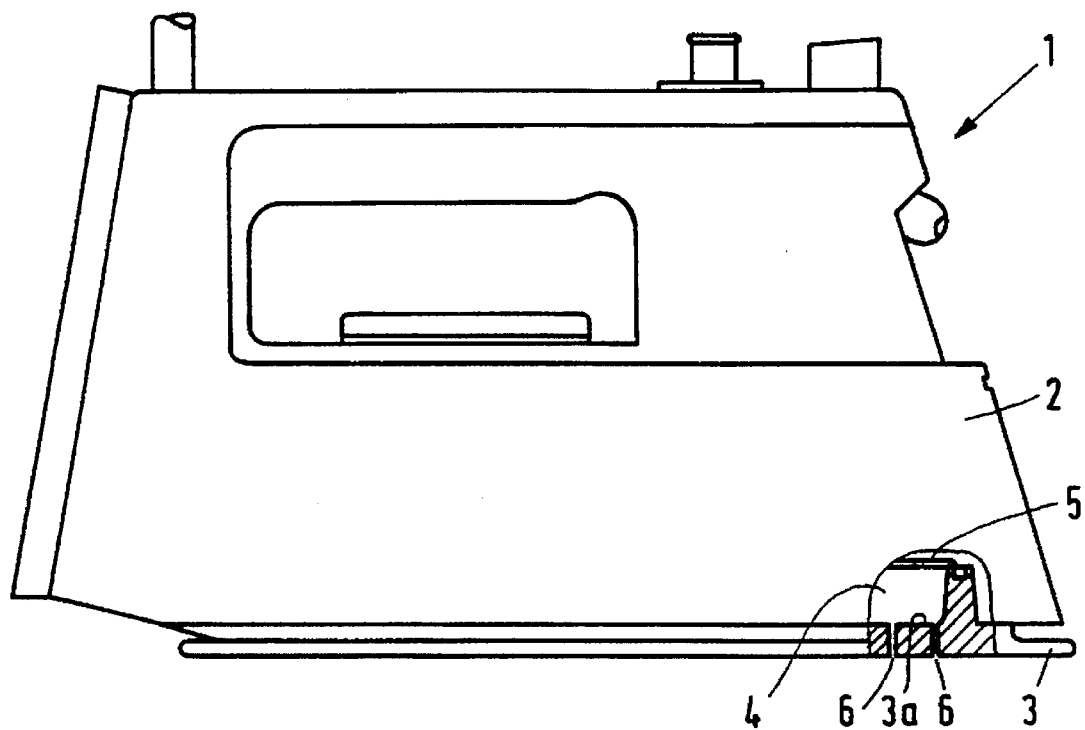
FIG. 1 shows a steam iron in which the invention is used.

The steam iron shown in FIG. 1 has a housing 2 with a soleplate 3 at the bottom of the housing. As is customary, the housing accommodates further parts, not shown, such as the water tank, the steam control, the temperature control device and the heating element. The steam chamber 4 is situated directly above the soleplate and is bounded by the inner side 3a of the soleplate 3 and a cover plate 5. The soleplate has steam ports 6, two of which are shown in FIG. 1 and which serve for discharging the steam produced in the steam chamber. The manner in which the steam chamber is sealed is shown to an enlarged scale in the other Figures.

The manufacture of the soleplate 3 is one of the process steps in the manufacturing process of a steam iron. The soleplate of a steam iron is generally made of an aluminium alloy and is obtained by a casting process, for example a die-casting process. Parts such as steam guiding fins and wails of the soleplate are formed integrally during this casting process. One of the walls thus formed is the upright wall 7 shown in FIGS. 2–4, which wall bounds the steam chamber 4 at the periphery. The wall 7 is a continuous wall which bounds the steam chamber along the entire circumference. In this casting process a continuous groove 8 is formed in the upper side 9 of the wall 7. The side walls 8a, 8c may have a slight outward tape (a few degrees) to facilitate removal from the die in the casting process. The steam chamber is closed by means of the cover plate 5. For this purpose a bent peripheral edge portion 10 of the cover plate is placed in the groove 8 in such a manner that an edge portion 10a extends along the inner side wall 8a of the groove and an edge potion 10b lies over a substantial part of the bottom wall 8b of the groove. The edge portions 10a, 10b, the inner side wall 8a and the bottom wall 8b form the contact surfaces of the cover plate and the soleplate, where sealing is effected. Subsequently, a deformable metal wire 11 is placed into the groove. By means of a die portion 12 of a pressing tool 13 the metal wire is pressed into the groove, causing plastic deformation of the wire. In this deformation process the wire is pressed both towards the bottom wall 8b and towards the two side walls 8a, 8c. The edge potions 10a and 10b of the cover plate 5 are then pressed gainst the inner side wall 8a and the bottom wall 8b of the groove and the material of the deformed wire provides further sealing of the circumferential edge 14 of the edge portion 10b relative to the bottom wall 8b (FIG. 3). This results in a sealing which can effectively withstand expansion and contraction owing to temperature variations. If desired, the deformed sealing wire 11 may be locked in position by plastic deformation of a peripheral potion 15 of the groove 8, in such a manner that it extends over the wire 11. This can be effected in the same process step in which the wire itself is deformed. For this purpose the pressing tool has an additional die portion 16 (FIG. 4).

Figure 2:
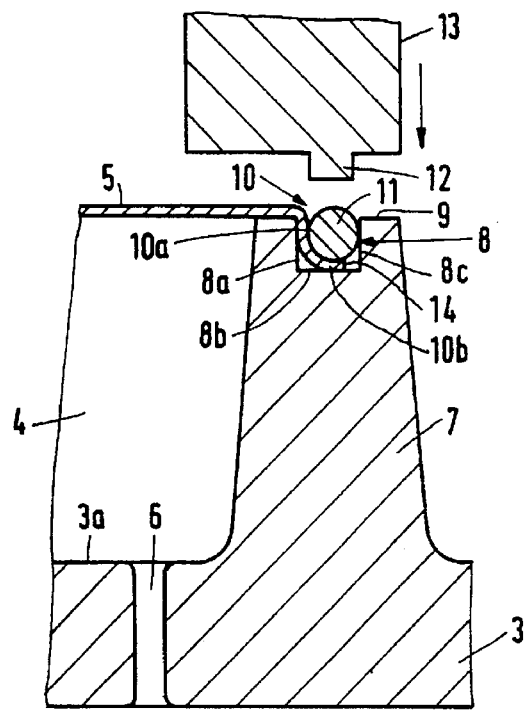
FIG. 2 is a cross-sectional view of a part of the soleplate of the steam iron shown in FIG. 1 and of the pressing tool prior to the sealing process.
Figure 3:
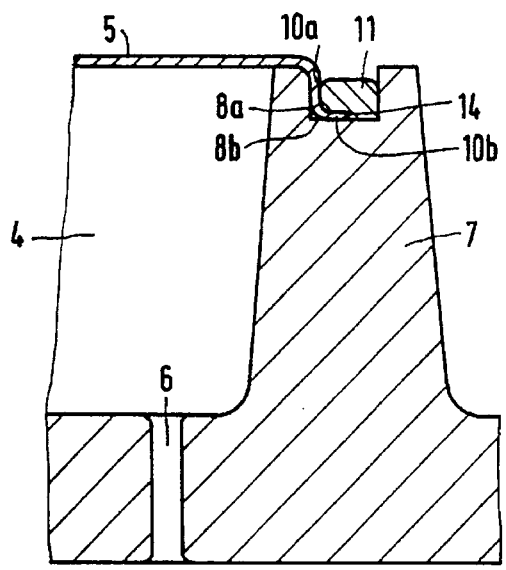
FIG. 3 is a cross-sectional view of a part of the soleplate as shown in FIG. 2, but after the sealing process has taken place.
Figure 4:
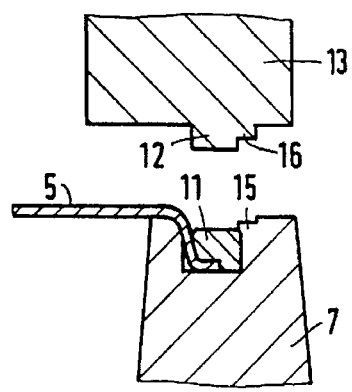
FIG. 4 is a cross-sectional view of a part of the soleplate as shown in FIG. 3, in which the deformed metal sealing wire is locked in position.
Figure 5:
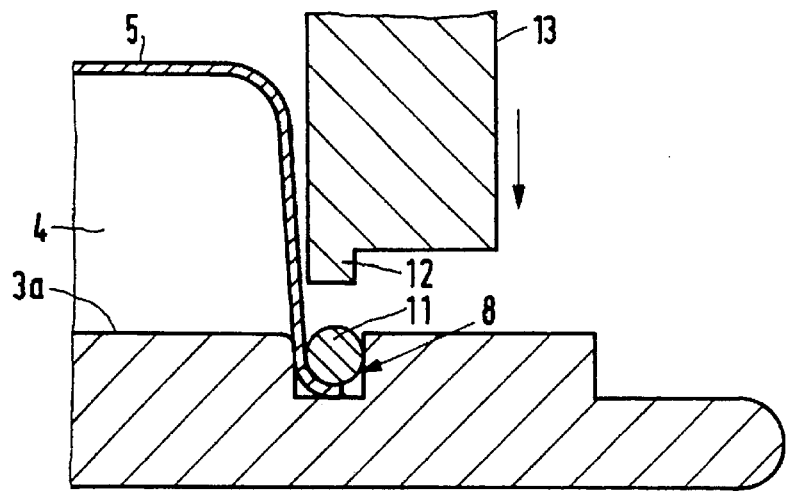
FIGS. 5 and 6 are cross-sectional views of a part of the soleplate, corresponding to FIGS. 2 and 3, respectively, the groove being formed directly at the upper side of the soleplate.
Figure 6:
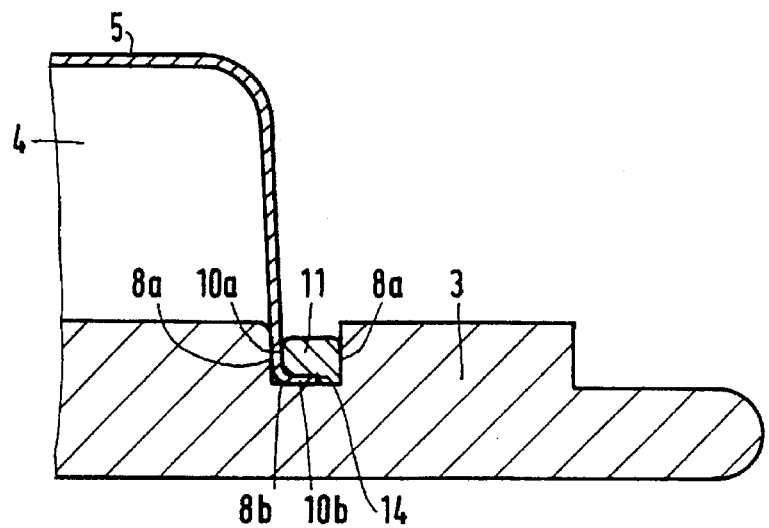
Figure 7:
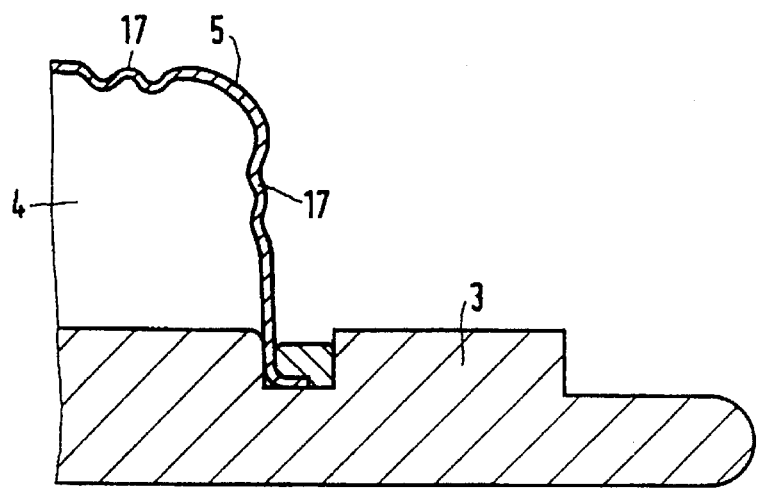
FIG. 7 is a cross-sectional view of a part of the soleplate as shown in FIG. 6, in which the cover plate in addition has expansion ridges.

FIGS. 5–7 show a slightly different embodiment, in which like parts bear the same reference numerals as in FIGS. 2–4. The groove 8 is formed directly in the inner side 3a of the soleplate 3, preferably also in the process of casting the soleplate. The cover plate 5 is now cap-shaped to form a steam chamber 4. Sealing of this steam chamber further proceeds in the same way as described with reference to FIGS. 2–4. In FIG. 7 the cover plate 5 in addition has expansion ridges or folds 17, which reduce forces exerted on the seal as a result of pressures acting on the steam chamber during operation.

The thickness chosen for the cover plate 5 can be substantially smaller than customary with the steam irons known until now. A soleplate of an aluminium alloy of AlSi7Mg, a cover plate and a sealing wire of pure aluminium, the cover plate having thicknesses of 0.2 to 0.6 mm, yield satisfactory results. Preferably, the coefficient of expansion of the material of the sealing wire is approximately equal to that of the soleplate and the cover plate. A foil-like cover plate has the advantage that it provides more freedom as regards the choice of the shape of the steam chamber. A foil-like cover plate may also have differences in thickness. The cover plates used until now are thick and substantially flat. Apart from the peripheral wall 7 of the steam chamber other walls, such as supporting walls for the water supply to the steam chamber and steam guiding fins, can also be sealed by means of the process described above.

A steel soleplate is also possible. The material chosen for the cover plate and the sealing wire can again be aluminium.

I claim:

1. A method of sealing a steam chamber of a steam iron, which steam chamber is bounded by a soleplate and a metal cover plate, the soleplate being formed with a groove, after which contact surfaces of the cover plate and the soleplate at the location of the groove are connected to one another by means of a pressing tool, wherein the contact surfaces of the cover plate are placed into the groove, and subsequently a metal wire is fitted into the groove, after which the metal wire is deformed by means of the pressing tool, the deformed wire pressing the contact surfaces of the cover plate against the contact surfaces of the groove and thereby provides the sealing.

2. A steam chamber for use in a steam iron, which steam chamber comprises at least one wall and a cover plate, the wall having a groove in which a peripheral edge potion of the cover plate and a sealing medium are situated to connect the cover plate and the wall to one another for the purpose of sealing, wherein the sealing medium consists of a deformed metal wire, the peripheral edge potion of the cover plate being clamped between wall potions of the groove and the metal wire.

3. A steam chamber as claimed in claim 2, wherein the steam chamber comprises a bottom with upright side walls, the groove being formed in an upper edge of the upright side walls.

4. A soleplate in combination with the steam chamber for a steam iron, as claimed in claim 3, the walls being integral with the solepate.

5. A steam iron comprising a housing and a soleplate, in combination with the steam chamber as claimed in claim 3.

6. A steam chamber as claimed in claim 2, wherein the cover plate is a foil having a thickness between 0.2 and 0.6 mm.

7. A soleplate in combination with the steam chamber for a steam iron, as claimed in claim 6, the walls being integral with the soleplate.

8. A steam iron comprising a housing and a soleplate, in combination with the steam chamber as claimed in claim 6.

9. A steam chamber as claimed in claim 2, wherein the cover plate has expansion ridges.

10. A soleplate in combination with the steam chamber for a steam iron, as claimed in claim 9, the walls being integral with the soleplate.

11. A steam iron comprising a housing and a soleplate, in combination with the steam chamber as claimed in claim 9.

12. A soleplate in combination with the steam chamber for a steam iron, as claimed in claim 2, the walls being integral with the soleplate.

13. A steam iron comprising a housing and a soleplate, in combination with the steam chamber as claimed in claim 12.

14. A steam iron comprising a housing and a soleplate, in combination with the steam chamber as claimed in claim 2.

* * * * *